United States Patent [19]
Swartz et al.

[11] Patent Number: 5,621,203
[45] Date of Patent: Apr. 15, 1997

[54] METHOD AND APPARATUS FOR READING TWO-DIMENSIONAL BAR CODE SYMBOLS WITH AN ELONGATED LASER LINE

[75] Inventors: Jerome Swartz, Old Field; Yajun Li, Oakdale; Paul Dvorkis, Stony Brook; Glenn Spitz, Northport, all of N.Y.

[73] Assignee: Symbol Technologies, Holtsville, N.Y.

[21] Appl. No.: 268,913

[22] Filed: Jun. 30, 1994

Related U.S. Application Data

[63] Continuation-in-part of Ser. No. 153,637, Nov. 17, 1993, abandoned, which is a continuation-in-part of Ser. No. 951,562, Sep. 25, 1992, Pat. No. 5,369,264, and a continuation-in-part of Ser. No. 66,966, May 25, 1993, abandoned.

[51] Int. Cl.⁶ .................................................. G06K 7/10
[52] U.S. Cl. ........................................ 235/462; 235/472
[58] Field of Search ................................ 235/462, 472, 235/494, 470; 358/473, 480, 481, 487, 494, 497; 382/313 OS

[56] References Cited

U.S. PATENT DOCUMENTS

| | | | |
|---|---|---|---|
| 3,051,051 | 8/1962 | Jeffree | 88/57 |
| 3,396,344 | 8/1968 | Broom | 331/94.5 |
| 3,780,270 | 12/1973 | Faulkner et al. | 235/462 |
| 3,790,756 | 2/1974 | Graves et al. | 235/462 X |
| 3,871,748 | 3/1975 | Day | 350/181 |
| 4,199,816 | 4/1980 | Humphrey | 364/571 |
| 4,251,798 | 2/1981 | Swartz et al. | 235/472 |
| 4,360,798 | 11/1982 | Swartz et al. | 340/146.3 |
| 4,369,361 | 1/1983 | Swartz et al. | 235/470 |
| 4,387,297 | 6/1983 | Swartz et al. | 235/462 |
| 4,387,397 | 6/1983 | Dietz | 358/154 |
| 4,409,470 | 10/1983 | Shepard et al. | 235/472 |
| 4,418,276 | 11/1983 | Yatsunami | 235/467 |
| 4,500,776 | 2/1985 | Laser | 235/162 |
| 4,508,686 | 4/1985 | Shaber et al. | 422/55 |
| 4,555,164 | 11/1985 | Feinbloom | 350/420 |
| 4,570,057 | 2/1986 | Chadima, Jr. et al. | 235/472 |

(List continued on next page.)

FOREIGN PATENT DOCUMENTS

| | | | |
|---|---|---|---|
| 0385478A2 | 5/1990 | European Pat. Off. | 235/462 |
| 0385478 | 9/1990 | European Pat. Off. | 235/462 |
| 0460699A2 | 6/1991 | European Pat. Off. | 235/462 |
| 0569962A2 | 5/1993 | European Pat. Off. | 235/462 |
| 0612034 | 8/1994 | European Pat. Off. | 235/462 |
| 55-88172 | 7/1980 | Japan | 235/462 |
| 60-238977A | 11/1985 | Japan | 235/462 |
| 0289470 | 11/1986 | Japan | 235/462 |
| 0073387 | 4/1987 | Japan | 235/462 |
| 0093871 | 4/1989 | Japan | 235/462 |
| 0198175 | 8/1991 | Japan | 235/462 |
| 3-266089A | 11/1991 | Japan | 235/462 |
| 2225659 | 6/1990 | United Kingdom | 235/462 |
| 2257280 | 6/1993 | United Kingdom | 235/472 |
| WO93/18478 | 9/1993 | WIPO | 235/462 |

OTHER PUBLICATIONS

"Quick Check 500" brochure, Photographic Sciences, 2 pages, 1989.
Barkan, Automatic I.D. News, "Author verifies the key to bar coding success" (Nov. 1988).
Grabowski et al., "Code Reading Mechanical Scanning Gun", IBM Technical Disclosure Bulletin vol. 5, No. 5, Oct. 1962.

*Primary Examiner*—Donald T. Hajec
*Assistant Examiner*—Thien Minh Le
*Attorney, Agent, or Firm*—Fish & Richardson P.C.

[57] ABSTRACT

A plurality of the areas of different light reflectivity of a bar code symbol, or the like, are simultaneously illuminated, using, e.g., a beam of laser light that has an elongated cross-section. The laser light beam is swept over the symbol in a direction transverse to the elongated dimension of the illuminated region so that a two-dimensional area of the symbol is illuminated over time, until the symbol is read. The light that reflects from the illuminated region of the symbol is imaged on a linear sensor array, which is then scanned or read out to produce signals representative of spatial intensity variations of the imaged light along a linear path in the field of view.

6 Claims, 5 Drawing Sheets

U.S. PATENT DOCUMENTS

| | | | |
|---|---|---|---|
| 4,606,660 | 8/1986 | Bradshaw et al. | 400/62 |
| 4,641,018 | 2/1987 | Mazumder et al. | 235/494 X |
| 4,652,750 | 3/1987 | Eastman et al. | 250/239 |
| 4,705,939 | 11/1987 | Ulinski, Sr. | 235/466 |
| 4,721,860 | 1/1988 | Troendle | 250/568 |
| 4,760,248 | 7/1988 | Swartz et al. | 235/472 |
| 4,777,357 | 10/1988 | Harada et al. | 235/463 |
| 4,794,239 | 12/1988 | Allais | 235/462 |
| 4,795,281 | 1/1989 | Ulinski, Sr. et al. | 400/74 |
| 4,820,911 | 4/1989 | Arackellian et al. | 235/467 |
| 4,822,986 | 4/1989 | Guthmueller et al. | 235/462 |
| 4,825,058 | 4/1989 | Polard | 235/472 |
| 4,826,269 | 5/1989 | Streifer et al. | 350/3.72 |
| 4,860,226 | 8/1989 | Martin et al. | 364/552 |
| 4,874,936 | 10/1989 | Chandler et al. | 235/494 |
| 4,894,790 | 1/1990 | Yotsuya et al. | 364/552 |
| 4,896,026 | 1/1990 | Krichever et al. | 235/472 |
| 4,896,029 | 1/1990 | Chandler et al. | 235/494 |
| 4,916,297 | 4/1990 | Tukada et al. | 235/462 |
| 4,916,298 | 4/1990 | Raphael | 235/470 X |
| 4,933,538 | 6/1990 | Heiman et al. | 235/462 |
| 4,980,544 | 12/1990 | Winter | 235/462 X |
| 4,992,649 | 2/1991 | Mampe et al. | 235/462 |
| 4,998,010 | 3/1991 | Chandler et al. | 235/494 |
| 5,013,895 | 5/1991 | Iggulden et al. | 235/110 |
| 5,034,904 | 7/1991 | Moy | 364/571.04 |
| 5,047,617 | 9/1991 | Shepard et al. | 235/467 |
| 5,059,779 | 10/1991 | Krichever et al. | 235/467 |
| 5,064,258 | 11/1991 | Inokuchi et al. | 350/3.71 |
| 5,067,093 | 11/1991 | Przybylowicz et al. | 364/498 |
| 5,073,954 | 12/1991 | Van Tyne et al. | 382/18 |
| 5,086,215 | 2/1992 | Carsner et al. | 235/462 |
| 5,115,334 | 5/1992 | Tomita | 359/216 |
| 5,194,720 | 3/1993 | Reinnagel et al. | 235/437 |
| 5,210,398 | 5/1993 | Metlitsky | 235/462 |
| 5,229,591 | 7/1993 | Heiman et al. | 235/472 |
| 5,235,167 | 8/1993 | Dvorkis et al. | 235/462 |
| 5,250,791 | 10/1993 | Heiman et al. | 235/472 |
| 5,276,315 | 1/1994 | Surka | 235/462 |
| 5,280,161 | 1/1994 | Niwa | 235/462 |
| 5,304,786 | 4/1994 | Pavlidis et al. | 235/462 |
| 5,414,251 | 5/1995 | Durbin | 235/470 X |

METHOD AND APPARATUS FOR READING TWO-DIMENSIONAL BAR CODE SYMBOLS WITH AN ELONGATED LASER LINE

CROSS REFERENCE TO RELATED APPLICATIONS

This application is a continuation-in-part of U.S. Ser. No. 08/153,637, filed Nov. 17, 1993, now abandoned which is herein incorporated by reference, which is in turn a continuation-in-part U.S. Ser. No. 07/951,562, filed Sep. 25, 1992, now issued U.S. Pat. No. 5,369,264. This application is also a continuation-in-part of U.S. Ser. No. 08/066/966, filed May 25, 1993, now abandoned which are herein incorporated by reference.

REFERENCE TO RELATED APPLICATIONS

This application is related to co-pending application Ser. No. 08/269,170 filed simultaneously with the filing of this application on Jun. 30, 1994, entitled "Apparatus and Method for Reading Indicia Using Charge Coupled Device and Scanning Laser Beam Technology" and a co-pending application Ser. No. 08/269,171 filed simultaneously with the filing of this application on Jun. 30, 1994, entitled "Tunnel Scanner with Multiple Scan Units Having Multiple Light Emitters and Optionally Utilizing a Charge Coupled Device Detector or Sensor Array" and co-pending application Ser. No. 08/268,589, filed simultaneously with the filing of this application on Jun. 30, 1994, entitled "Multiple Laser Indicia Reader Optionally Utilizing a Charge Coupled Device (CCD) Detector and Operating Method Therefor".

BACKGROUND OF THE INVENTION

This invention relates to bar code readers.

Typically, bar code symbols are formed from bars or elements that are typically rectangular in shape with a variety of possible widths. The specific arrangement of these elements defines a character according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, groups of elements are concatenated together to form the complete bar code symbol, with each character of the message being represented by its own corresponding group of elements. In some symbologies, unique "start" and "stop" characters are used to indicate where the bar code begins and ends. A number of different bar code symbologies exist. These symbologies include, e.g., UPC/EAN, Code 39, Code 49, Code 128, Codabar, and Interleaved 2 of 5.

In order to increase the amount of data that can be represented, or stored, on a given amount of surface area, several new bar code symbologies have recently been developed. One of these code standards, PDF 417 (developed by the present assignee), uses a "two-dimensional" scheme in which rows of characters are stacked vertically. That is, there are several rows of bar and space patterns, instead of only one row.

Thus, bar codes include not only the traditional rectangularly-shaped bars and spaces, but any form of symbol in which different portions of the symbol have different light reflecting characteristics.

Bar codes are typically scanned to transform the graphic symbol elements into electrical signals, which are then decoded into characters. A scanning system uses a light source, typically a laser, which is directed to the symbol or bar code by lenses or other optical components. The reader functions by repetitively scanning the light beam in a path or series of paths across the symbol. Scanning systems also include a sensor or photodetector which detects light reflected from the symbol. A portion of the reflected light is detected and converted into an electrical signal, and electronic circuitry or software decodes the electrical signal into a digital representation. The symbol is decoded according to the coding technique used.

For example, in a Universal Product Code (UPC) bar code typical on many supermarket items, the first five digits indicate the manufacturer of the item, and the second five digits indicate the item number, which may be used by a computer to look-up the current price of the item, and to deduct that item from the supermarket's inventory.

A bar code offers several advantages over other data representations. A bar code allows data to be entered into a computer more rapidly. Bar code systems are nearly error-free. Bar code formats are designed with various forms of error-checking built into the code.

In recent years, there have been increasing demands for storing more information in a bar code label. In particular, there is a desire to create a "portable data file", as opposed to the "licensed plate" nature of conventional bar code symbols.

For example, a typical UPC bar code only contains the manufacturer's code and the item number. The price look-up must be accessed in a database keyed to the item number in the bar code. A two-dimensional bar code, on the other hand, could be used to store all of the relevant information, such as price, the name of the product, manufacturer, weight, inventory data, and expiration date. This would constitute a "portable data file" because the information could be retrieved without having to access a database. While a price look-up database file is conveniently available in a retail environment, this may not be the case in other applications.

Although two-dimensional bar code schemes do not have vertical redundancy, they incorporate other forms of redundancy as well as other advantages, while increasing the density of information storage. For example, Code PDF 417 allows stitching of partial scans, error detection, and error correction.

Typical bar code readers can be placed in one of two general categories. Readers in the first category use a mechanical movement to sweep a laser beam across the bar code. These readers typically include a focusing lens which focuses the beam to a narrow "spot" on the bar code, a steering mirror which, by mechanical rotation, sweeps the "spot" across the bar code, and a light sensor which detects the time variation of the intensity of the reflected light and converts this time variation into bars and spaces. Readers in the second category have a detector with a wide field of view. Typically, an optical system images the bar code onto a linear CCD array or other fixed array of sensors. A bright light source, such as a linear array of light emitting diodes (LEDs) is placed near to the bar code so as to illuminate the entire bar code. The spatial variation of the reflected light is detected by the self-scanning action of the CCD array and converted into electrical signals representing bars and spaces.

An important advantage of readers in the second category is the greater field of view achieved by the detectors.

However, because such a design requires that the entire bar code be illuminated at one time, and because known bar code readers use diffuse light sources such as LEDs to illuminate the bar code, readers of the second category typically exhibit high power consumption and poor illumination.

SUMMARY OF THE INVENTION

The invention features a novel method and apparatus for reading two-dimensional symbols that have regions of different light reflectivity (e.g., two-dimensional bar codes). This novel reading technique can be implemented with only a small number of light sources and with a mechanically simple design, while offering a high signal-to-noise ratio. The invention provides a method and apparatus that enables the use of the same type of reader, e.g., a hand-held reader, for reading different, previously incompatible, bar code symbologies.

In general, according to the invention, certain portions or areas of a bar code symbol, or the like, are simultaneously illuminated using, e.g., a beam of laser light that has an elongated cross-sectional shape. The light that reflects from the illuminated region of the symbol is imaged on a sensor which is scanned to produce signals representative of spatial intensity variations of the reflected light along a path. The laser light beam is then moved over the symbol in a direction transverse to the elongated dimension of the illuminated region of the symbol so that another portion of the symbol can be read. The motion is either continuous or in a stepped motion so long as there is sufficient time for the reflected light to be properly imaged and processed. The beam is swept over the height of the symbol so that the entire two-dimensional area of the symbol is illuminated over time, and such motion is repeated in a back-and-forth manner until the entire symbol is read.

Embodiments according to the invention require relatively low power, yet still provide sufficient illumination for reading various types of light reflecting symbols.

The beam preferably diverges in an elongated cross-sectional dimension. The elongated cross-sectional dimension of the beam, in the plane of the symbol, is preferably long enough to illuminate the entirety of one dimension of a row of the symbol at one time. The beam preferably does not converge to a waist in the elongated cross-sectional dimension.

The invention is particularly useful for reading various two-dimensional bar code symbols. For example, to read a two-dimensional bar code symbol consisting of a stack of parallel data rows, a bar code reader according to the invention is aligned so that the elongated dimension of the beam is generally parallel with the rows of the symbol. Preferably only one of the data rows is illuminated at one time.

Alternatively, for example, matrix code symbologies, such as one formed from one or more identical shapes (e.g., hexagons), has been proposed which has a three-fold symmetry that allows the symbol to be read, according to the invention, with the elongated dimension of the beam aligned generally parallel with one of three different axes of symmetry.

In another aspect, the invention provides a reader which uses a laser diode to illuminate, at the same time, more than one of the regions of varying reflectivity of a symbol, so that, in at least one dimension, the laser light diverges and does not converge to a waist. Preferably, a multiplicity of regions (more preferably, the entire symbol) are illuminated at the same time. When illuminated by laser light in this fashion, the field of view can be scanned and the symbol decoded by detecting the spatial variation in the reflected light.

In preferred embodiments, the laser light is dispersed by a cylindrical lens configured to reduce spread of light along the shorter dimension of the bar code but disperse light along the longer dimension of the bar code. Regions of the bar code are imaged onto a CCD sensor array to detect the spatial variation of the light reflected from the bar code. Alternatively, the spatial variation may be detected by sequentially focusing light from different regions of the bar code onto a single sensor. The reader may be used with a conventional, one dimensional bar code, or alternatively with a two dimensional bar code having rows of differently-arranged bars and spaces.

Other features and advantages will be apparent from the following description and from the claims.

DESCRIPTION OF THE PREFERRED EMBODIMENTS

As used in this specification and the claims, the term "symbol" and "bar code" is intended to be broadly construed and to cover not only patterns composed of alternating bars and spaces of various widths, but also other one or two dimensional graphic patterns, as well as alphanumeric characters.

Figure 1:
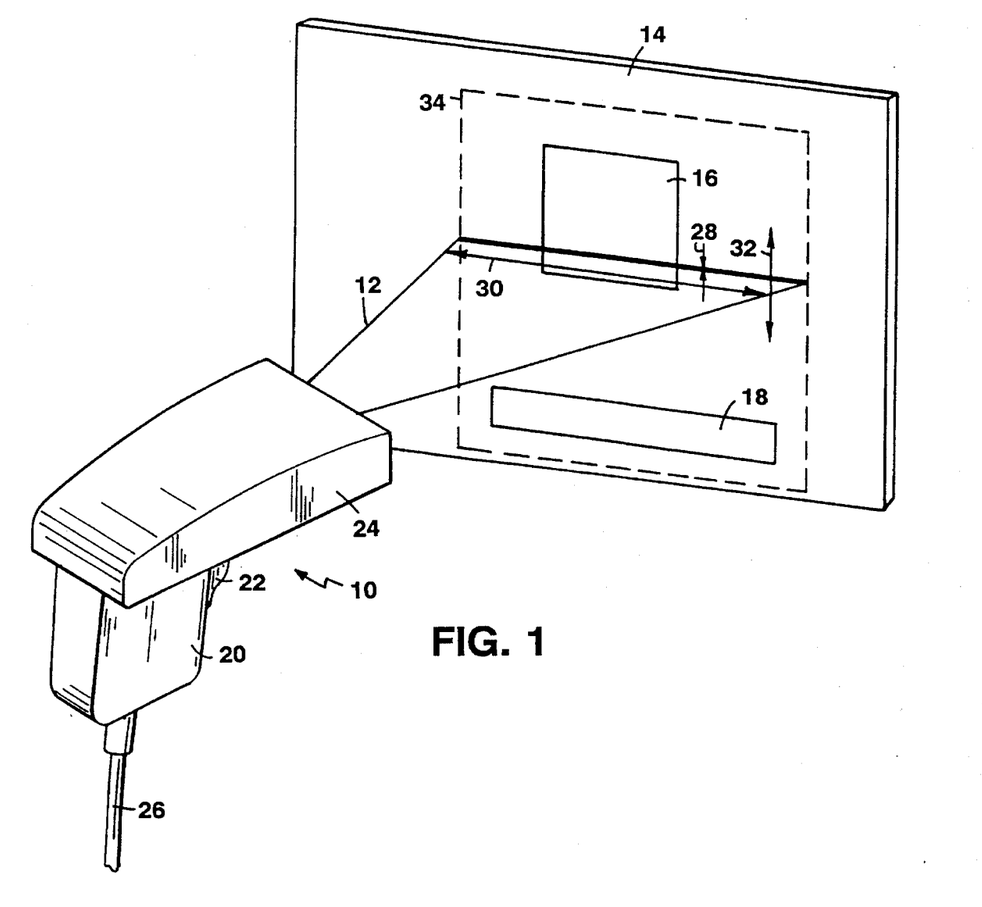
FIG. 1 is a perspective view of a hand-held reader scanning a two-dimensional bar code and a one-dimensional bar code which are affixed to a surface.

Referring to FIG. 1, a hand-held reader 10 is positioned to direct a beam 12 of laser light at a surface 14 on which a two-dimensional bar code symbol 16 and a one-dimensional bar code symbol 18 are affixed. The reader is preferably implemented as a gun-shaped device with a pistol-grip handle 20. A manually actuated trigger switch 22 allows an operator to activate the reader (typically once the reader has been positioned to point at the particular symbol to be read.)

A light-weight plastic housing 24 contains the optical components of the reader including a laser source and a photodetector. A light-transmissive window, at the front end of the reader, allows the beam generated by the laser to exit the reader, and allows reflected light from bar code symbols 16, 18 to enter the reader.

An electrical cable 26 carries signals from reader 10 to a decode module (not shown) that decodes the signals from the reader representative of the scanned bar code symbols. An external host device (not shown), e.g., a programmable computer, serves as a data store in which data generated by the decode module is stored for subsequent processing.

Each time a user wishes to read a bar code symbol, the user aims reader 10 at the symbol and pulls trigger 22 to initiate reading the symbol. Beam 12 exits the reader having a cross-sectional size with a narrow dimension 28 and an elongated diverging dimension 30. The beam preferably does not converge to a waist in elongated dimension 30. Beam 12 then sweeps over surface rate in the back-and-forth direction generally indicated by double-headed arrow 32 (i.e., transverse to the elongated dimension of the beam), and thereby illuminates surface 14 in a rectangular field-of-view 34 over time, as shown in phantom. As soon as the symbol has been successfully decoded and read, the scanning action is automatically terminated, indicating to the user that the reader can be directed at another symbol.

Figure 2A:
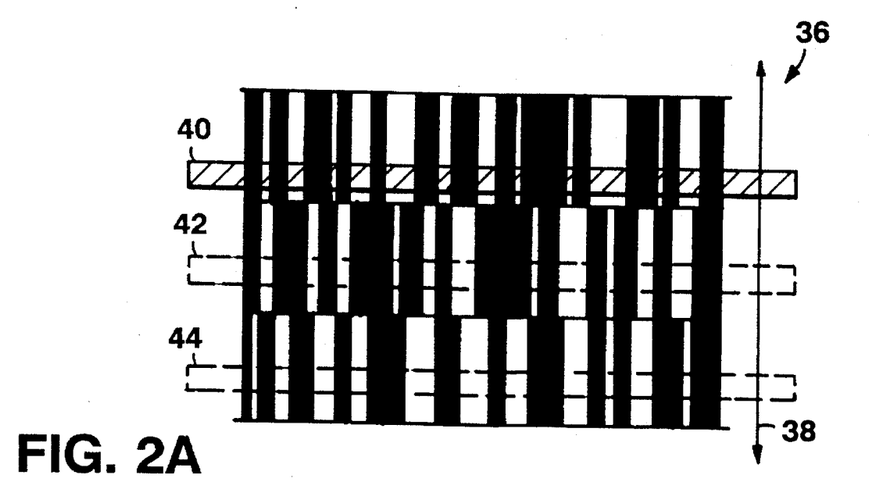
FIG. 2A is an enlarged view of a two-dimensional bar code symbol formed from a stack of parallel data rows illuminated by three successive light beams having elongated cross-sections using a reader according to the invention.

As shown in FIG. 2A, a two-dimensional bar code symbol 36 is read by sweeping the laser light beam over the symbol. Over time, symbol 36 is successively scanned in the direction indicated by arrow 38, as indicated by illuminated regions 40, 42, and 44. It should be noted that some two-dimensional bar code schemes e.g., PDF417, allows stitching together of partial scans and thus do not require the illuminated regions to lie completely within a single row as shown. This is due, at least in part, to the fact that any two adjacent data rows in such schemes encode data using codewords selected from different, mutually exclusive sets.

Figure 2B:
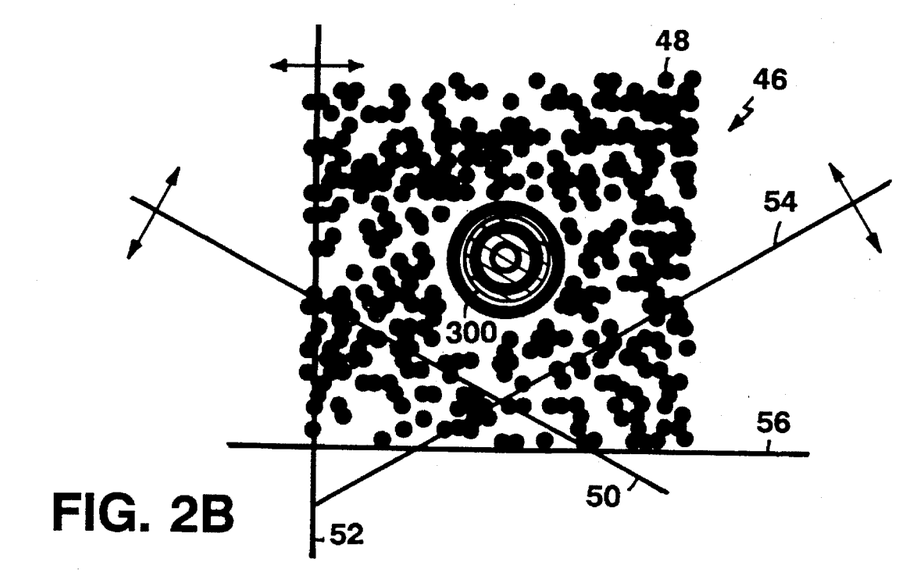
FIG. 2B is an enlarged view of a two-dimensional symbol formed from a plurality of hexagonal shapes that can be read by elongated light beams according to the invention that are aligned parallel with one of the three axes of symmetry of the symbol.

In another two-dimensional bar code scheme shown in FIG. 2B, a two dimensional bar code 46 is formed from a plurality of identical hexagonal shapes 48 which are aligned in rows parallel with three different axes of symmetry. This allows the symbol to be read by sweeping beams with elongated cross-sections over the symbol in directions generally parallel with the axes of symmetry of the symbol, as indicated by illuminating beams 50, 52, and 54.

In addition to the use of an elongated static laser beam 50, 52 and 54, it is possible to use one or more static spots, e.g., as described in Heiman et al., U.S. Pat. Nos. 5,250,791, 5,229,591, and 4,933,538, which are assigned to the present assignee and which are all incorporated herein by reference. Alternatively, a combination of spots and scan lines can be used to form the aiming pattern. Alternatively, or in addition thereto, one may use a blinking aiming beam (either spot, line or combination)) to highlight to the user that the reader is in an aiming mode. For example, if the two-dimensional bar code incorporates a bulls eye for aiming purposes, it would be useful for the aiming beam to incorporate a blinking spot to align with the center of the bulls eye, in addition to the solid line which is used for aligning with the edge of the code. See the blinking spot 300 in FIG. 2B as an example.

The blinking spot 300 may be implemented in a variety of ways which are described herein for completeness. In the simplest case, the spot may be generated by a fixed laser light source which is mechanically shuttered, or activated and deactivated periodically by an electronic circuit generating a pulse signal. A more complete implementation would provide a "spot" beam that would alternate between a static spot and a short line. Such an implementation would provide a pulse signal of different frequencies both to the laser diode and a scanning mirror so as to achieve the alternation between a spot and a narrow line.

Figure 3:
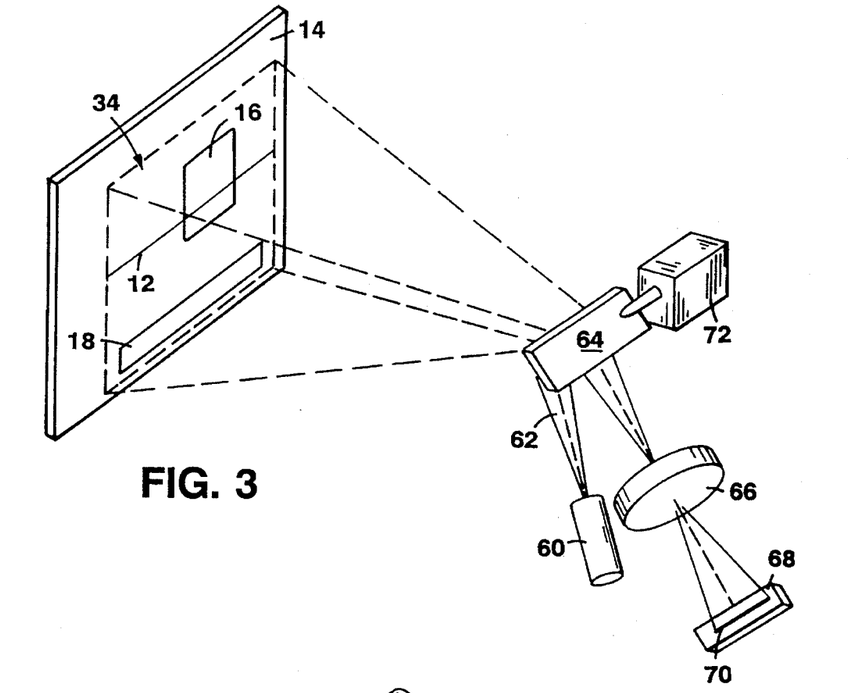
FIG. 3 is a schematic perspective view of a scanning system for use with the reader shown in FIG. 1.

The illuminated beams 50, 52 and 54 may be produced by a single scanning arrangement which is angularly repositioned after each scan, or by separate independent scanning arrangements that are spatially positioned to produce the three laser light beam lines shown in FIG. 2B. FIG. 3 illustrates a single independent scanning arrangement in detail, but it should be recognized that two, three or more such arrangements may be implemented in a single reader to be able to produce the multiple line pattern such as shown in FIG. 2B. Note that orthogonal beams 52 and 56 may be utilized by a user to "frame" the symbol, and so position and orient the reader so as to align the static laser beam parallel to an edge or axis of symmetry of the symbol. This is especially important in the case of a hand-held reader, such as shown in FIG. 1. Before describing the scanning arrangement of FIG. 3, the operational modes can be discussed in greater detail.

The features of the present invention may be utilized to operate the reader in different modes. There are three possible modes that we might consider for a hand-held reader according to the present invention: (a) the normal triggered mode; (b) the triggered spot and scan mode; and (c) the object sensor mode.

In the normal triggered mode, the laser beam is initially off. A trigger switch is used in the triggered mode to initiate both activating the static laser beam and the rapid and repetitive scanning of the target symbol. In many applications, it is necessary to distinguish between whether many scans have been performed for one object, or whether one scan has been performed for many objects. The capability of sensing each object to be scanned in its turn is critical for successful decoding.

As is known in prior art scanners (such as described in U.S. Pat. No. 4,387,297) a manual trigger may be used for actuating the light source and/or the scanning means to repetitively sweep the barcode symbol a number of times each time the trigger is actuated. The trigger is preferably a manually-depressible switch mounted on the housing in the vicinity of the interconnection of the barrel and handle portions of the housing. The trigger switch is located on the handle portion such that the forefinger of the user's hand can be used to manually depress the switch. Each time the switch is depressed, the laser beam is activated, and the scanning means sweeps the symbol many times, until a complete decode of the entire symbol or a time out is reached.

Either a single-position trigger or a multi-position trigger may be used.

In the normal triggered mode, when the decode circuitry successfully decodes the symbol, the decode circuitry generates a successful decode signal and may actuate the indicator means located in the scanner. The indicator means comprises an auditory-type beeper and/or a light-emitting diode. When the beeper sounds and/or when the diode lights up, then the user knows that the scanning for that particular symbol has been terminated.

In the triggered spot and scan mode, after the trigger is pulled, the beam comes on a fixed or static mode. In such an operational mode, one or more very bright lines, spots or patterns are formed by the optics from the laser beam (i.e., the "spot" mode). The bright beam is used by the user holding the laser reader to manually aim and direct the beam to the location where the user actually sees the barcode is located. Once the reader has been properly positioned, the user may pull the trigger to begin the scanning process (i.e., the "scan" mode). As an alternative to triggered operation, in the automatic spot and scan mode, when an indicia pattern indicative of a barcode symbol has been detected by software, the beam will automatically begin to sweep the entire symbol so that it can be decoded.

In the object sensor mode, the reader is triggerless and the constantly on fixed or static laser beam is used to allow the user to position the reader. When an indicia pattern indicative of a barcode symbol has been detected, the beam will begin sweeping the symbol until the beam reads the entire symbol.

Any or all of the above operational modes may be utilized in a single reader utilizing the bar code symbol detection techniques known in the art. Such operational modes may be chosen manually by the user (such as by setting a switch) or may be automatically determined and dedicated in a particular type of reader. The particular type of scanning parameter may also conceivably be automatically determined by an analysis of the detected bar code and a computer algorithm may determine the most appropriate subsequent scanning mode to be utilized in order to most effectively scan and detect the entire bar code symbol. Such alternative embodiments are all within the range and scope of the present invention.

In the preferred method of reading according to the present invention, a two-dimensional bar code symbol is presented having a plurality of ordered rows of bar-coded information, each row extending generally along a longitudinal direction, with the rows being successively arranged along a transverse direction generally perpendicular to the longitudinal direction.

The symbol is illuminated with a first longitudinal beam of light extending in a first direction, and a second longitudinal beam of light extending in a second direction orthogonal to the first direction, by the reader. The user then manually positions the reading device so that at least one of the beams is aligned parallel to the row of the symbol.

Light reflected over a field of view extending along the longitudinal direction is detected, and a first electrical signal indicative of the detected light over the longitudinal direction is generated.

The first electrical signal is processed by software to determine is the reflected light in the longitudinal direction represents one of the rows. The detection and processing steps are repeated until the longitudinal direction corresponds to one of the rows, thereby signifying that the reading device is properly aligned with the bar code. Upon proper alignment, the sweeping motion is initiated.

A relative movement between the field of view and another of the rows along the transverse direction is performed, either automatically by a mirror, or by mechanical motion.

Light is reflected off said another of the rows, and detected, generating a second electrical signal indicative of the detected light over such rows, and decoding the second electrical signal to produce data represented by such row. The detection and decoding steps are repeated until data in each of the rows has been decoded so that the entire two-dimensional bar code symbol has been decoded.

Referring to FIG. 3, a laser line generator 60 emits a laser light beam 62 that diverges in one dimension (and over a certain distance converges in the other) toward optical component 64 (e.g., an oscillatable mirror or lens), which in turn directs the fixed, static beam 12 toward the bar code symbols to be read.

As beam 12 illuminates the surface 14, light reflecting from a portion of the bar code symbols 16 is collected and directed to a lens 66. Lens 66 preferably focuses the collected beam of light onto a one-dimensional charge-coupled device (CCD) sensor 68. The focused light 70 has a cross-sectional size with a long dimension and a narrow dimension which correspond to the long and narrow dimensions of beam 12, respectively. This correspondence allows the CCD to scan the field of view and generate signals representative of the spatial intensity variations in the light reflected from the illuminated portion of the bar code symbol in the field of view, such as a row or linear group of modules.

An optical lens and an optical filter can be mounted inside the reader and positioned to intercept the reflected incoming light before the light reaches the detector. If a filter is used, it is desirable that the filter only selectively transmit light having a wavelength range corresponding to the wavelength range of the scanned laser beam.

An electrically-operated drive 72 preferably moves component 64 in alternating circumferential directions to produce back-and-forth sweeping of beam 12 across surface 14 over a field-of-view 34. In an alternative embodiment, the drive causes the component to rotate completely around an axis of rotation 74.

Alternatively, the scanning optics may comprise an omni-directional scan pattern generator that generates intersecting laser line patterns, as described in Krichever et al., U.S. Pat. No. 5,059,779 (assigned to the present assignee) which is herein incorporated by reference. According to this scheme, a beam that has an elongated cross-section can be swept over the symbol in different reading directions until the elongated dimension of the beam is properly aligned with the symbol and the symbol can be read. For example, the scan pattern generator can be used to successively produce illuminating beams 50, 52 and 54 shown in FIG. 2A.

Figures 4A, 4B:
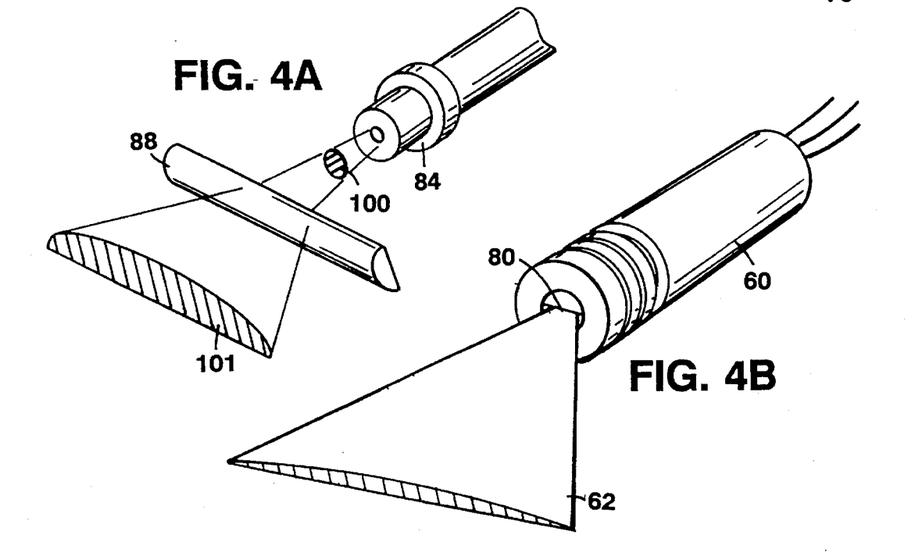
FIGS. 4A, 4B and 4C are exploded perspective and side cross-sectional views, respectively, of a light source for use with the reader shown in FIG. 1.
Figure 4C:
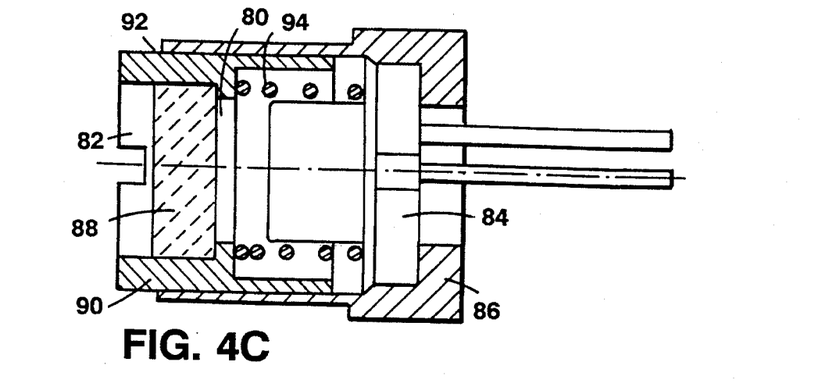

FIGS. 4A–4C illustrate the construction of the laser line generator 60. As shown in FIG. 4A, a laser diode 84 generates a light beam which has a generally elliptical cross section, and which in the near field (close to the laser diode) has a cross section 100 with a particular size, shape and orientation. A cylindrical lens 88 is positioned adjacent the laser diode 84 so that the long axis of the lens 88 corresponds to the long axis of the elliptical cross section 100. The lens 88 functions to broaden or diverge the beam 100 in the direction of the elongated axis of the ellipse producing a very narrow, elongated beam 101. FIG. 4B shows the packaging of the assembly in the laser line generator 60.

Referring to FIG. 4C, which depicts a cross-section of the assembly 60, laser beam 62 exits laser line generator through an aperture 80 and a window 82. A laser diode 84 is seated in laser holder 86, and a cylindrical or toric lens 88 is seated in lens holder 90. Between these two holders is a threaded interface 92. Lens holder 90 is urged away from laser holder 86 by spring 94.

During manufacture, the laser line generator is focused by sliding lens holder 90 with respect to laser holder 86. As soon as the desired focus is achieved, the two holders are permanently fixed relative to one another by a variety of possible techniques, including using adhesives such as glue or epoxy, fastening by staking, spot welding, and ultrasonic welding.

Figure 5A:
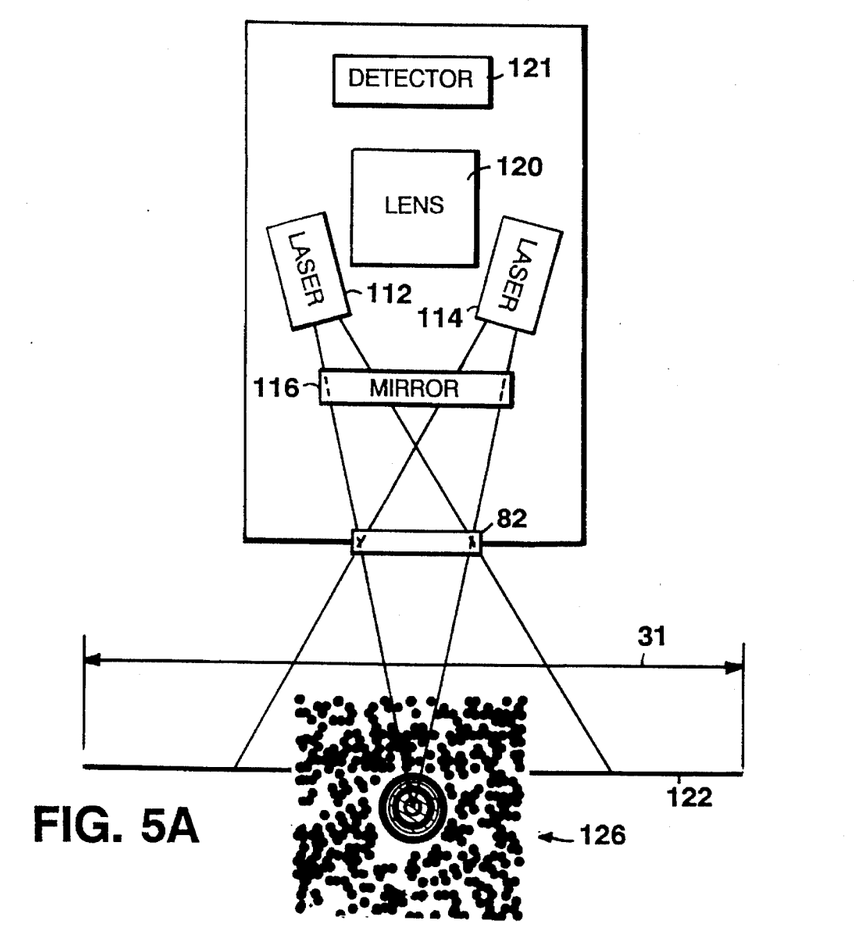
FIG. 5A is a top plan view of an alternative scanning system for use with the reader shown in FIG. 1.

Referring to FIG. 5, an alternative reader 110 employs two laser line generators 112, 114. A scanning component 116 (e.g., a rotating mirror) directs the beams generated by generators 112, 114 toward the target to be read through window 118. The light reflected from a target is collected by lens 120 which in turn focuses the collected light onto a detector 121, e.g., a 1024 pixel linear CCD array.

Two laser line generators are used in this embodiment due to the fact that the irradiance distribution along a laser beam from a single source is not uniform, but instead decreases rapidly from the center of the beam in a manner generally following a Gaussian distribution. Summing together the outputs from two laser line generators provides a more uniform intensity distribution along the resulting laser line.

Figure 5B:
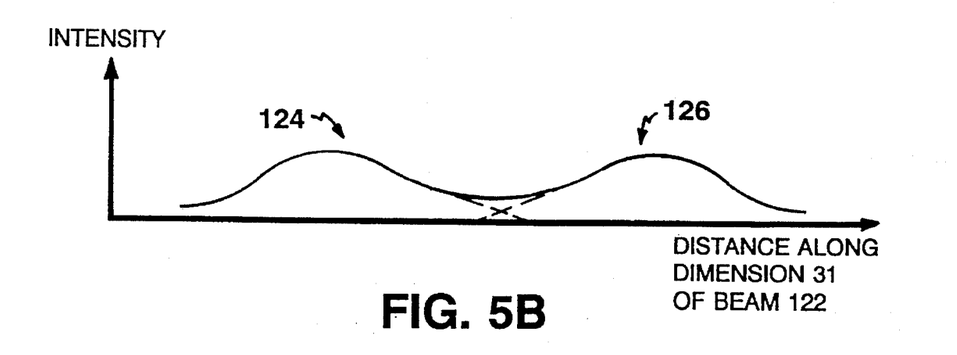
FIG. 5B is a graph of the cross-sectional intensity profile of the beam shown in FIG. 5A as a function of spatial dimension along the beam parallel to the elongated dimension of the beam.

Referring to FIGS. 5A and 5B, a laser beam line 122 resulting from the optical summation of the beam outputs 124, 126 from laser line generators 112, 114, respectively. As shown in FIG. 5B, the uniformity of the intensity profile across the elongated dimension of beam 122 is significantly improved relative to the intensity profile of only one of the beams alone, as shown in phantom.

The combination of the outputs from more than one source enables a longer laser line to be produced which has a resulting intensity that is sufficient to adequately illuminate a symbol 126 for reading, thereby providing reader 110 with an elongated field of view. In an exemplary embodiment of reader 110, the cross sectional line length along long the dimension of the resulting beam varies from about five to ten inches at respective distances from window 82 of about four to twelve inches.

Figure 6A:
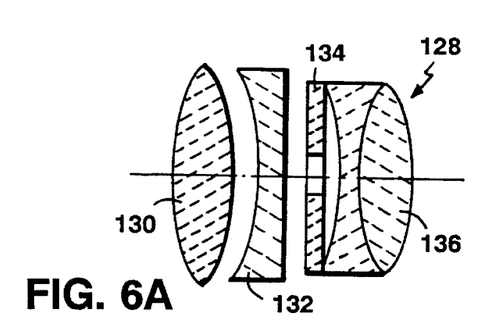
FIGS. 6A and 6B are cross-sectional views of different lens arrangements for use with the reader shown in FIG. 1.
Figure 6B:
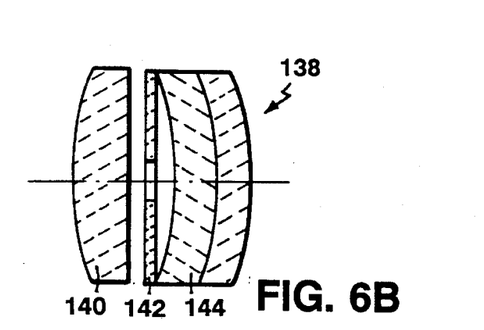

FIGS. 6A and 6B are cross-sectional views of preferred embodiments of the detector lens 120 which is selected to provide a flat image field and semi-wide angle field of view. A Tessar lens 128, shown in FIG. 6A, formed from a positive lens 130, a negative lens 132, a pinhole aperture 134 and a cemented doublet 136, can be used. Alternatively, lens 138, which is a simplified version of lens 128, can be used. Lens 138 is formed from a positive lens 140, a pinhole aperture 142, and a cemented doublet 144, and has a similar performance as lens 128.

Figure 7:
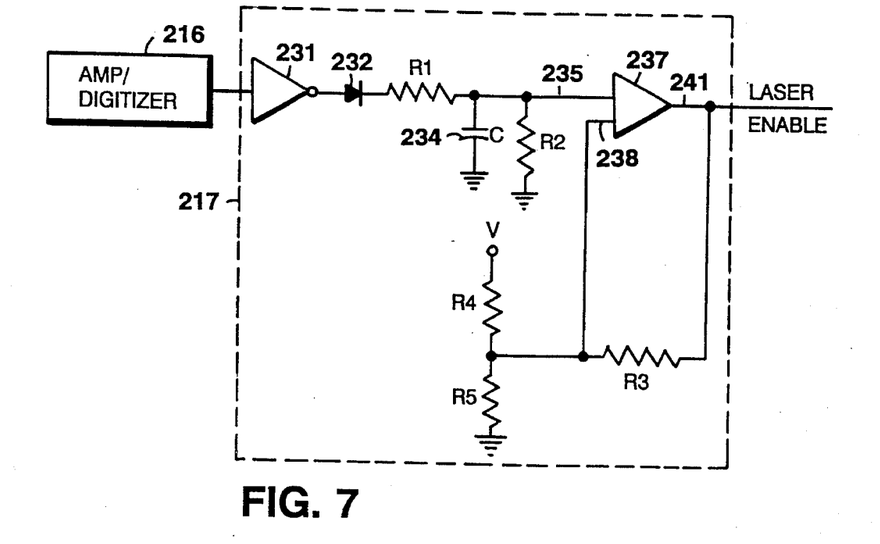
FIG. 7 is a schematic diagram of a detector circuit for use in the reader shown in FIG. 1.

Turning next to FIG. 7, there is shown a schematic diagram of an embodiment of a preferred detector-circuit 217. The signal from the amplifier/digitizer 216 is applied to the input of an inventor 231, the output of which is applied to a diode 232. An RC circuit is formed by first resistor R1 and capacitor (C) 234 is connected between the first input 235 and ground potential, and a second resistor R2 is connected between first input 235 and ground potential. The resistance value of resistor R1 is preferably must less than that of resistor R2.

The second input 238 of the comparator is connected to the mode of a voltage divider formed by resistors R4 and R5 which are connected in series between potential V and ground. The output 241 of the comparator 237 is connected to the "laser enable" signal line, as well as a feedback through a resistor R3. The feedback from the output of the comparator 237 provides a hysteresis effect to the comparison operation since the other terminal of the resistor R3 is connected to the second output 238 of the comparator 237. The operation of the detector circuit 217 can be described as follows: when the digitizer outputs a bar, the capacitor charges up with a time constant of approximately R1C since R2 is much greater than R1. When the digitizer outputs a space, the capacitor discharges through R2 since the diode 232 prevents the discharging through R1. The time constant R2C is much greater than the time constant R1C so that more space time is required to cancel the effect of a bar.

After several bars and spaces of typical density, a voltage is developed on the capacitor 234 which exceeds the threshold which has been set with the user of the comparator 237. At this time, a "trigger" or laser enable signal is output from the comparator 237 to indicate the presence of a bar code.

The open collector output of the comparator 237 is driven low at this point which lowers the threshold of the comparator so that minor voltage changes on the capacitor 234 due to the following bars and spaces, and quiet zone, will not disable the trigger signal.

The circuit as described would also trigger if a long black bar were to be scanned. However, in the preferred embodiment, the digitizer includes a circuit which discriminates against reading a long black bar, i.e., the digitizer functions as a high pass filter. One such digitizer circuit would utilize a time-out so that if a long black bar was scanned, only a short pulse would be generated. When such a short pulse signal is applied to the detector circuit 216, the threshold will not be exceeded and a "trigger" signal will not be output.

The trigger signal will only be released after a relatively long time during which there are no bars digitized. When the scanner is moved away from a symbol, the capacitor will discharge through R2C and the trigger signal will be released which will indicate to the decoding logic or the detector circuit that the same symbol is no longer being scanned.

The bar code sensing circuit depicted in FIG. 7 is sensitive to a specific pattern of images. The circuitry is responsive to a pattern of high and low reflected light signals to charge and discharge the capacitor 234, with the net charge being utilized to generate a trigger signal after some threshold has been reached.

The circuit described in FIG. 7 is useful to discriminate a barcode in the scan field from text or other graphics. To do this it exploits the single dimension aspect of a bar code to differentiate it from text. It relies on motion of the scanline, which ordinarily would come from motion of the scanner in a user's hand, to compare different slices of the pattern in the scanfield. If successive slices were similar, within limits determined by the implementation, it was highly probable that a barcode was being scanned. If successive slices were dissimilar, it was likely that a barcode was not being scanned. This algorithm is modified to allow two dimensional bar code to be discriminated from graphics. It relies on the one dimensional nature within regions in the Y dimension.

The algorithm according to the present invention is preferably implemented in software, and executed by the CPU 140 in the scanner. An algorithm can be used to discriminate among one dimensional bar codes, two dimensional (or "stacked") barcodes, and text or other graphics, as described in U.S. Pat. No. 5,235,167, which is herein incorporated by reference. A raster scan pattern is naturally suited to work together with such an algorithm since it automatically provides the movement of the scanline orthogonal to the scanline orientation, which guarantees that successive scanlines cross different slices of the scanned pattern, which is relied upon by the algorithm.

Scanning is typically initiated by actuation of the trigger switch. A symbol is scanned by illuminating the symbol with the elongated beam. If the symbol is one-dimensional the CPU attempts to decode the received signal. If the one-dimensional symbol is successfully decoded, the decoded data is sent out for further processing. If the one-dimensional symbol is not successfully decoded, the symbol is scanned until the symbol is successfully decoded, or until a predetermined amount of time has elapsed. If it is determined that the symbol is two-dimensional, the symbol is scanned by sweeping the elongated beam across the region of the symbol. If the two-dimensional symbol is successfully decoded, then the decoded data is sent out for further processing. If the two-dimensional symbol is not decoded, the symbol is continuously scanned until a successful decode has occurred or until a predetermined amount of time has elapsed, which is on the order of about three seconds, or until an operator has had sufficient time to sight the symbol and obtain a successful decode.

The above algorithm minimizes the amount of processing that would be done on the data provided from the scanner, and thus reduces the latency the system will have in fully reading a barcode symbol. Another feature of the algorithm is to provide a method to control operational parameters of the scanning system, such as horizontal and vertical scan angles, in response to the type of barcode that is determined to be scanned.

Although the present invention has been described with respect to reading one or two-dimensional bar code symbols, it is not limited to such embodiments, but may also be applicable to more complex indicia scanning or data acquisition applications. It is conceivable that the method of the present invention may also find application for use with various machine vision or optical character recognition applications in which information is derived from indicia such as printed characters or symbols, or from the surface or configurational characteristics of the article being scanned.

In all of the various embodiments, the elements of the scanner may be implemented in a very compact assembly or package, such as a single printed circuit board or integral module. Such a board or module can interchangeably be used as the dedicated scanning element for a variety of different operating modalities and types of data acquisition systems. For example, the module may be alternatively used in a hand-held scanner, a table top scanner attached to a flexible arm or mounting extending over the surface of the table or attached to the underside of the table top, or mounted as a subcomponent or subassembly of a more sophisticated data acquisition system.

Each of these different implementations is associated with a different modality of reading bar code symbols. Thus, for example, the hand-held scanner is typically operated by the user "aiming" the scanner at the target; the table top scanner operated by the target being moved rapidly through the scan field, or the target being "presented" to a scan pattern which is imaged on a background surface. Still other modalities that are within the scope of the present invention envision the articles being moved past a plurality of scan modules oriented in different directions so at least the field of view of one of the scan modes is able to scan the symbol which may be arbitrarily positioned on the article.

The integral module would advantageously comprise an optics sub-assembly mounted on a printed circuit card or support, and a photodetector or sensor component. Control or data lines associated with such components may be connected to an electrical connector mounted on the edge or external surface of the card or module to enable the module to be electrically connected to a mating connector associated with other elements of data acquisition system.

An individual module may have specific scanning or decoding characteristics associated with it, e.g., operability at a certain working distance, or operability with a specific symbology or printing density. The characteristics may also be defined through the manual setting of control switches associated with the module. The user may also adapt the data acquisition system to scan different types of articles, or the system may be adapted for different applications by interchanging modules on the data acquisition system by removing one module and plugging in another using the electrical connector.

The scanning module described above may also be implemented within a self-contained data acquisition system including one or more such components as a keyboard, display, printer, data storage, central processor, application software and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

It will be understood that each of the features described above, or two or more together, may find a useful application in other types of scanners and bar code readers differing from the types described above.

What is claimed is:

1. A method for reading a symbol representing information having areas of different light reflectivity, comprising the steps of:

providing a beam of laser radiation, the beam having an elongated cross-sectional shape with an elongated dimension and a narrower dimension;

simultaneously illuminating a plurality of the areas of different light reflectivity of the symbol with said beam;

imaging light reflecting from the illuminated region to produce a signal representative of spatial intensity variations of the imaged light along a path; and sweeping said beam over the symbol in a direction transverse to the elongated dimension so that substantially the entire two-dimensional area of the symbol is illuminated over time, until the information represented by the symbol is read wherein the symbol is a two-dimensional symbol, said symbol comprising regions of different light reflectivity formed from one or more shapes that are aligned in rows parallel with at least one axis, wherein said steps of illuminating comprises aligning said beam so that the elongated dimension of said illuminated region is substantially parallel to said at least one axis wherein the shapes are aligned in rows parallel with three different axes that intersect each other at a point to form acute angles of 60° therebetween, wherein the step of illuminating comprises aligning said beam so that the elongated dimension of said illuminated region is substantially parallel to one of said three different axes.

2. A method of reading with a hand-held reading device a two-dimensional bar code symbol having a plurality of ordered rows of bar coded information, each row extending generally along a longitudinal direction, said rows being successively arranged along a direction generally transverse to the longitudinal direction, comprising the steps of:

(a) illuminating the symbol with a first elongated beam of light extending in a first direction, and a second elongated beam of light extending in a second direction transverse to the first direction;

(b) manually positioning the device so that at least one of said beams is aligned parallel to a row of said symbol;

(c) detecting light reflected over a field of view extending along the longitudinal direction and generating a first electrical signal indicative of the detected light over said longitudinal direction;

(d) processing the first electrical signal to determine if the reflected light in the longitudinal direction represents said one of the rows; and (e) repeating said steps (c) and (d) until the longitudinal direction corresponds to one of the rows.

3. A method as defined in claim 2, further comprising the steps of:

sweeping at least one of said beams over the symbol in a direction transverse to the elongated dimension of the illuminated region by said one beam so that the entire two-dimensional area of the symbol is illuminated over time, until all of the information by the symbol is detected and read.

4. The method of claim 3 wherein said sweeping step is performed by causing relative motion between the symbol and said beam.

5. The method of claim 2 wherein the elongated cross-sectional shape of each of said beam is imparted to each of said beams by receiving a source laser beam from a semiconductor laser diode and optically broadening the larger cross-sectional axis of said source laser beam in the elongated axial dimension.

6. The method of claim 2 wherein the rows are parallel to three different axes that intersect each other at a point to form acute angles of 60 degrees therebetween, and the direction generally transverse to the longitudinal direction is 60 degrees from the longitudinal direction.

* * * * *

UNITED STATES PATENT AND TRADEMARK OFFICE
CERTIFICATE OF CORRECTION

PATENT NO.   : 5,621,203

DATED        : April 15, 1997

INVENTOR(S)  : Jerome Swartz, Yajun Li, Paul Dvorkis, and Glenn Spitz

It is certified that error appears in the above-identified patent and that said Letters Patent is hereby corrected as shown below:

Cover page, [56] References Cited, FOREIGN PATENT DOCUMENTS, "0460699A2" should be --0460669A2--.

Cover page, [56] References Cited, OTHER PUBLICATIONS, the Grabowski et al. reference, after "Bulletin", insert --,--.

Col. 1, line 9, after "abandoned", insert --,--.

Col. 1, line 11, after "-part", insert --of--.

Col. 1, line 13, "08/066/966" should be --08/066,966--.

Col. 1, line 14, after "abandoned", insert --,--.

Col. 1, line 14, "are" should be --is--.

Col 5, line 20, after "30", insert --.--.

Col. 7, line 48, "is" should be --if--.

Col. 9, line 24, after "along", delete "long".

UNITED STATES PATENT AND TRADEMARK OFFICE
CERTIFICATE OF CORRECTION

PATENT NO. : 5,621,203

DATED : April 15, 1997

INVENTOR(S) : Jerome Swartz, Yajun Li, Paul Dvorkis, and Glenn Spitz

It is certified that error appears in the above-identified patent and that said Letters Patent is hereby corrected as shown below:

Col. 9, line 46, "must" should be --much--.

Signed and Sealed this

Second Day of June, 1998

Attest:

Attesting Officer

BRUCE LEHMAN

Commissioner of Patents and Trademarks